J. L. BONDY.
FENCE.
APPLICATION FILED OCT. 5, 1911.
1,136,999.
Patented Apr. 27, 1915.
3 SHEETS—SHEET 1.
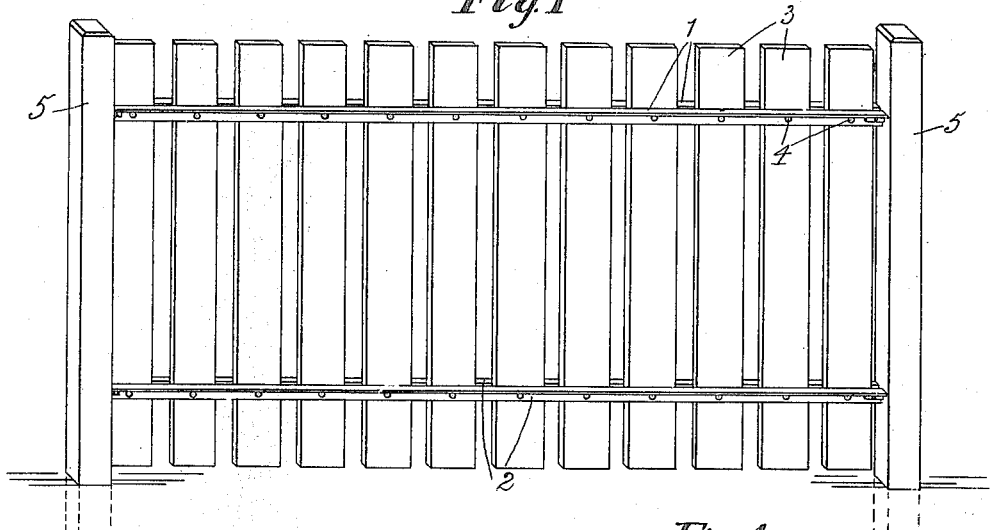
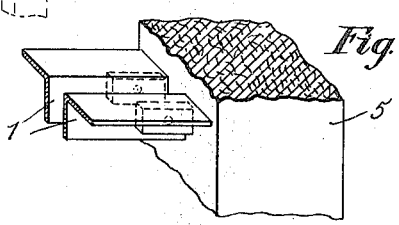
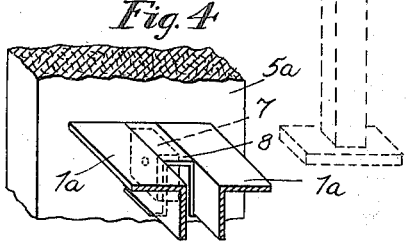
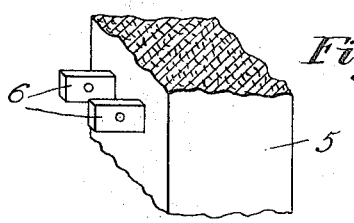
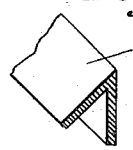
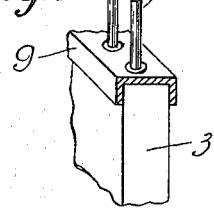
Witnesses:
Robert F. Bracke
Leonard W. Novander
Inventor
Joseph L. Bondy
By Bower & Williams
Attorneys
THE NORRIS PETERS CO., WASHINGTON, D. C.

J. L. BONDY.
FENCE.
APPLICATION FILED OCT. 5, 1911.
1,136,999.
Patented Apr. 27, 1915.
3 SHEETS—SHEET 2.
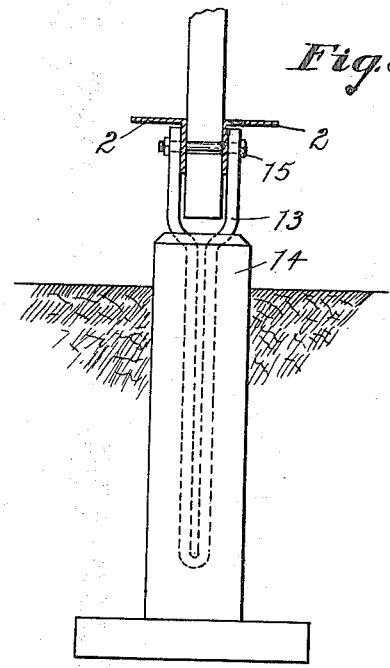
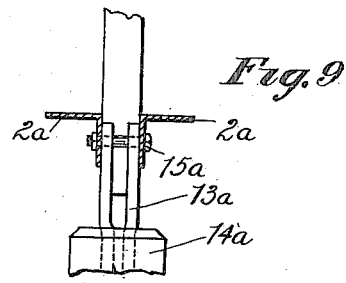
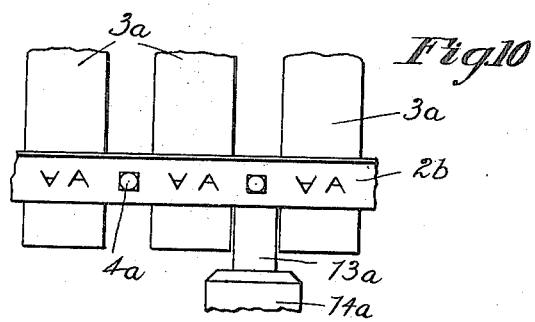
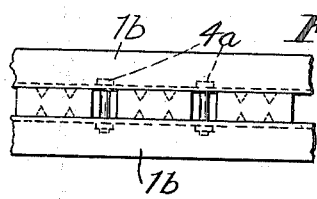
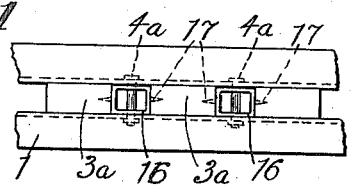
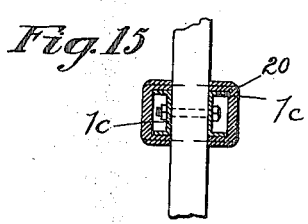
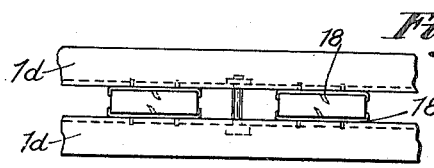
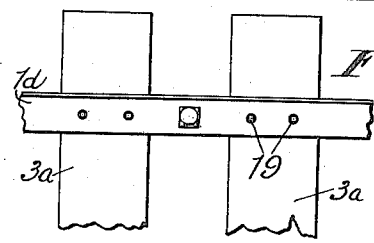
Witnesses:
Robert F. Bracke
Leonard W. Novander
Inventor
Joseph L. Bondy
By Moewe & Williams
Attorneys

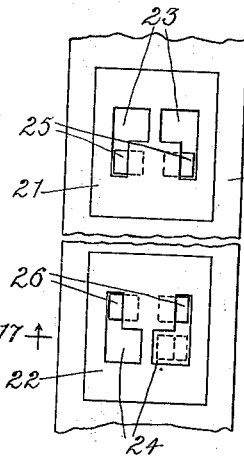
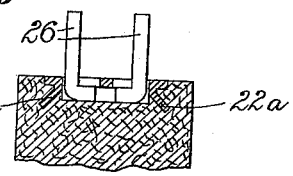
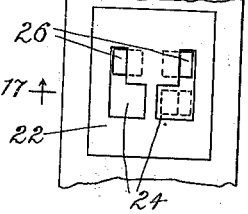
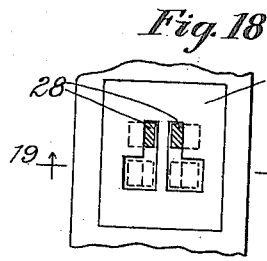
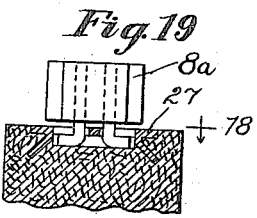
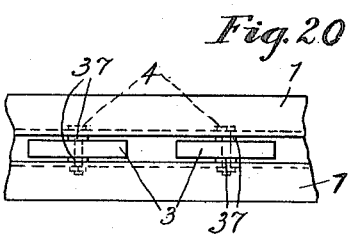

UNITED STATES PATENT OFFICE.

JOSEPH L. BONDY, OF CHICAGO, ILLINOIS.

FENCE.

1,136,999.  Specification of Letters Patent.  Patented Apr. 27, 1915.

Application filed October 5, 1911. Serial No. 652,923.

*To all whom it may concern:*

Be it known that I, JOSEPH L. BONDY, a citizen of the United States, residing at Chicago, in the county of Cook and State of Illinois, have invented a certain new and useful Improvement in Fences, of which the following is a full, clear, concise, and exact description, reference being had to the accompanying drawings, forming a part of this specification.

My invention relates to an improved fence construction by which the fence may be manufactured entirely at a factory and shipped in sections to where it is to be erected, and by which a good appearance of the fence is secured. By my construction I preferably employ double rails, that is, a rail upon each side of the fence, at the top and bottom thereof, between which the fence boards are supported either in tight or open arrangement as desired. The posts employed in connection with the fence structure are preferably of concrete and are equipped with devices for readily supporting in place the fence sections.

My invention further consists in details of construction for securely holding the parts together for facilitating the erection of the fence without in any way interfering with the shipment of the parts.

The several drawings illustrating my invention are as follows:

Figure 1 shows a section of fence erected between posts constructed to support it. Figs. 2 and 3 are perspective details of portions of one of the posts showing the supports extending therefrom which are used to receive the ends of the rails of the fence. In Fig. 2 the rails are shown in place on the supports, while in Fig. 3 the rails are removed. Fig. 4 shows a modified construction for supporting the ends of the rails of the fence from one of the posts. Fig. 5 is a detail view showing a modified form of rail construction. Fig. 6 is a detail view showing a construction employed for capping the upper ends of the fence boards. Fig. 7 is a detail view showing a means for individually capping the upper ends of fence pickets which may be employed. Fig. 8 shows in detail an auxiliary post or support which may be used to support the central portion of each fence section if desired. Fig. 9 is a modified construction of the auxiliary post shown in Fig. 8. Fig. 10 shows a modified form of rail construction which may be employed to hold the fence pickets in place. Fig. 11 is a top view of a portion of a fence section in which the rails are constructed, as shown in Fig. 10. Figs. 12 and 13 show in views similar to Fig. 11 modified constructions for supporting narrow fence pickets in a fence section. Fig. 14 shows in elevation a portion of a fence section in which the construction shown in Fig. 13 is employed. Fig. 15 shows a means for concealing the metal rails of the fences if desired. Fig. 16 shows in detail a portion of one of the supporting posts, the modified construction herein shown being particularly designed to facilitate transportation of the posts after they are constructed. Fig. 17 is a sectional view of the parts shown in Fig. 16 taken along the line 17—17. Fig. 18 shows in a view similar to Fig. 16 a modified construction for a type of fence different from that shown in Fig. 16. Fig. 19 is a sectional view of the parts shown in Fig. 18 taken along the line 19—19. Fig. 20 shows in plan view a portion of a fence section to illustrate the manner of separating the fence boards from the supporting rails if desired.

Similar numerals refer to similar parts throughout the several views.

As shown in Fig. 1, the fence consists of upper and lower rails 1 and 2 formed preferably of rolled iron or steel shapes such as angle bars, channel bars, etc. Fence boards 3 are supported between the two pair of rails and securely held in place by bolts 4 extending through the rails and fence boards. The ends of the rails 1 and 2 are supported from the concrete posts 5 so that the lower ends of the boards are clear of the ground. The upper pair of rails 1 are opposite each other as are the lower pair, and the rails are supported centrally of the posts 5, and thus the fence has precisely the same appearance from either side. The posts 5 may be constructed in a variety of ways, one of which is shown in Figs. 2 and 3. In this form of construction, supporting bars 6 are secured in the posts when they are made so that the ends of the rails 1 will rest between and upon such bars. Each post is also provided with similar bars for supporting the ends of the lower rails. This arrangement may be, used when the fence is to be tight, that is, with the fence boards in contact with each other. As a result of the construction described it will appear that the posts 5 may be manufactured at a distance from the place at which the fence is to be erected, and that the fence sections and posts may be shipped and erected with the greatest facility and after the posts 5 have been properly set, the sections of fence may be placed upon the supporting bars 6 and securely held thereon by means of bolts extending through the ends of the rails 1 and 2 and the outwardly projecting ends of the bars 6.

In Fig. 4 a modified construction is shown which is adapted for use with an open fence, that is, a fence in which the boards are separated at some distance from each other. In this construction but a single supporting bar 7 is placed in each post $5^a$ to support one end of a pair of rails $1^a$ and the ends of this pair of rails are supported from the outwardly projecting end of the bar 7 by means of a saddle 8 bent so that it rests upon the bar 7 and its ends extend under the vertical legs of the angle bars $1^a$. When a section of open fence is placed between posts $5^a$ with the saddles 8 in proper position, the parts are held together by suitable bolts extending through the ends of the rails $1^a$, the saddle 8 and the bar 7.

In many cases it may be advisable to use rails of different cross-section than those shown in Figs. 1, 2 and 4, as for example, to prevent climbing the fence I have found that rails $1^b$ having a cross-section as indicated in Fig. 5 are preferable for this purpose. These rails differ only from the rails shown in Figs. 1, 2 and 4 in that the legs of the angle bar form an acute angle with each other instead of right angles as indicated in Figs. 1, 2 and 4. If desired, small channel bars $1^c$ may be used as indicated in Fig. 15 instead of the angle bars 1 or $1^a$. The conformation of the rails employed is determined largely by the character of fence desired, and the location in which it is to be used. The principal requirement in every case is that the rails, however constructed, shall be of iron or steel and symmetrically disposed upon the two sides of the fence, and further that the fence sections shall be centrally supported by the posts to give the fence as a whole a symmetrical appearance.

In many cases it is desirable to provide a protection for the top of the fence boards and where a continuous protecting strip is desired, I have found a channel bar as shown at 9 in Fig. 6 to answer admirably. The protecting strip 9 may be provided with protection points 10 or not as desired, and when so provided, the points are preferably of soft iron or steel electrically welded to the channel bar 9. In the case of a picket fence it is frequently desirable, particularly where the pickets are comparatively narrow, to protect the upper ends of such pickets by means of metal caps, and such a construction is indicated in Fig. 7 in which the picket $3^a$ has secured to its upper end a metal cap 11 which may, if desired, be formed of sheet metal by punches and dies so as to exactly fit pickets of certain sizes. Protection points 12 may be secured by electric welding if desired to the caps 11.

In connection with many constructions, it is desirable for the purpose of reducing the weight of the fence sections and for more positively supporting such sections, to provide an auxiliary post as indicated in Fig. 8 to support the lower rails and therefore the corresponding fence section. This auxiliary post is preferably constructed of a bent bar 13 of iron or steel embedded in a concrete post 14 which is set in line with the posts 5 and midway between them to engage the rails 2. The upwardly extending ends of the bar 13 are bent to surround the lower end of the middle fence board and to engage the rails 2 outside of such board for the tight form of construction. When in place, a bolt 15 extending through the ends of the bar 13 and the rails 2 serves to securely hold the parts together. In the modified construction shown in Fig. 9 the bar $13^a$ has its upper ends so bent as to engage the inner surfaces of the rails $2^a$ employed in connection with a section of open fence and in this modification the ends of the bar $13^a$ are disposed between two of the fence boards or pickets as shown in Fig. 10.

In supporting narrow pickets by means of my construction it is desirable frequently to provide some other means of support than bolting through the pickets since they may readily be removed from the fence by splitting them whether this occurs accidentally or intentionally and to prevent this I may employ a number of constructions as follows: In Figs. 10 and 11 the rails $1^b$ and $2^b$ have punched from their vertical legs small triangular projections or points which enter the pickets $3^a$ when the rails are held together by means of the bolts $4^a$. In this manner the necessity for making large holes through the pickets is avoided and by being held at more than one ponit it is difficult to remove a picket from the fence by splitting it. In the construction shown in Fig. 12 the same result is secured by another construction in which the bolts $4^a$ extend through rectangular frames 16 which carry points 17 extending therefrom into the edges of the pickets $3^a$. The rectangular frames 16 are of a size to just fill the spaces between the pickets $3^a$ between the rails 1 and 2 and thus when the pickets are assembled between the rails the points 17 serve to securely hold the pickets in position.

In the modified construction shown in Figs. 13 and 14 bent bars 18 are provided having their ends conformed to extend around the edges of the pickets and provided with one or more projecting points extending into the pickets. The bars 18 also are provided with one or more projecting points projecting through suitable holes 19 formed in the rails 1ᵈ to receive them. As a result of this construction, when the rails are held together by means of the bolts as indicated, the points or projections extending from the bars 18 by their engagement with the pickets 3ᵃ and the rails 1ᵈ securely hold the pickets in place. It frequently is required to improve the portions of the fence by concealing the rails used to support the fence boards, and this I accomplish as shown in Fig. 15 by grooving a cover strip 20 so as to receive the rail 1ᵉ and then securing the cover strip in place over the rail by means of nails.

To prevent the damage which may result when it is required to ship the posts long distances, the modified construction shown in Figs. 16 to 19 inclusive is employed. In these figures the construction shown in Figs. 16 and 17 is for a tight fence construction while the arrangement shown in Figs. 18 and 19 is for an open fence construction. In Figs. 16 and 17 the post 5ᵇ has secured into the face which is to engage a fence section a pair of metal plates 21 and 22 held in place by inwardly extending flanges 21ᵃ and 22ᵃ extending into the concrete as indicated in Fig. 17. The plates 21 and 22 have formed through them openings 23 and 24, these openings being enlarged in the plate 21 at their upper ends and the plate 22 at their lower ends so that the bent ends of the bars 25 and 26 may pass freely therethrough, but when the ends of such bars are inserted through the larger portions of the openings into the recesses provided therefor and then moved to the smaller portions of the openings 23 and 24, the bent ends of the bars 25 and 26 engage the plates 21 and 22 which prevent the removal of the bars in a direction perpendicular to the face of the post. The construction of the plate 27 shown in Figs. 18 and 19 is similar to the plates 21 and 22 with the exception that the openings in each plate are oppositely disposed relatively to each other and the bent ends of the bars 28 extend outwardly away from each other instead of toward each other as indicated in Figs. 16 and 17. The outwardly extending ends of the bar 28 may support a saddle 8ᵃ to receive the ends of the rails of the fence section and the parts when thus supported are bolted together in a manner similar to that described above. The same is true of the modification shown in Figs. 16 and 17, the bars 25 and 26 being bolted to the rails supported thereby when such bars and fence sections are in proper position. For either the modification shown in Figs. 16 and 17 or the modification shown in Figs. 18 and 19 it will be observed that when the parts are properly bolted together the fence section can not be moved vertically since the bars engage the supporting plates at opposite ends of the openings formed in such plates, and further that as long as vertical motion of the fence section is prevented the bars supporting the fence section cannot be removed from the posts, and thus the fence section is properly held in place.

While I have referred to the pickets employed as fence-boards, it is to be understood that any form of picket may be used and that these pickets may be of any material desired, since the form and material may be taken to meet the special requirements of any particular case.

I find it desirable to construct the fence sections in some cases so that the fence boards are out of contact with the rails to prevent the accumulation of moisture between the rails and the boards after a rain. This I accomplish by placing upon the bolts 4, washers 37 between the rails 1 and the boards 3. In this manner a free space is left between the boards and the rails and any water falling upon the rails will flow between the rails and the boards and will not accumulate to keep the boards moist and rot them.

While I have shown my invention in the embodiments pointed out above, it will, of course, be understood that other constructions may be employed for accomplishing the results indicated without departing from the spirit of my invention.

What I claim is:

1. In a fence, the combination of a fence section comprising a plurality of fence boards, metal rails symmetrically disposed upon either side of the boards to support them, bars bent at right angles extending from the ends of the rails, and concrete posts provided with supporting plates having T-shaped openings through them to receive the ends of the bent bars.

2. In a fence, the combination of a fence section comprising a plurality of fence boards, metal rails symmetrically disposed upon either side of the boards to support them, bars bent at right angles extending from the ends of the rails, and concrete posts provided with supporting plates having openings through them to receive the ends of the bent bars, such plates and bent bars so conformed as to lock the rails to the post when the bars are in place.

3. In a fence, a combination of a section comprising a plurality of fence boards, metal rails symmetrically disposed on opposite sides of the fence boards for supporting them, concrete posts carrying devices for engaging the ends of the rails and means wholly contained in the space between the rails for maintaining a space between the rails and boards, said means provided with means extending into the body of the boards for preventing relative endwise motion of the boards.

4. In a fence, the combination of a plurality of vertical pickets disposed in substantially parallel relation, metal rails symmetrically placed upon each side of the pickets, bolts extending through the rails between the pickets to hold the latter in place, and devices carrying prongs projecting into the body of the pickets to prevent their relative displacement from between the rails.

5. In a fence, the combination of a plurality of vertical pickets disposed in substantially parallel relation, metal rails symmetrically placed upon either side of the pickets, bolts extending through the rails between the pickets to hold the latter in place, and prongs embedded in the faces of the pickets to prevent their displacement from between the rails.

6. In a fence, the combination of a plurality of vertical pickets disposed in substantially parallel relation, metal rails symmetrically placed upon either side of the pickets, bolts extending through the rails between the pickets to hold the latter in place, and bars having prongs formed thereon to engage the pickets and the rails to prevent movement of the pickets relatively to the rails.

In witness whereof, I hereunto subscribe my name this 27th day of September, A. D., 1911.

JOSEPH L. BONDY.

Witnesses:
ALBERT C. BELL,
LEONARD E. BOGUE.

Copies of this patent may be obtained for five cents each, by addressing the "Commissioner of Patents, Washington, D. C."